Figure 11:
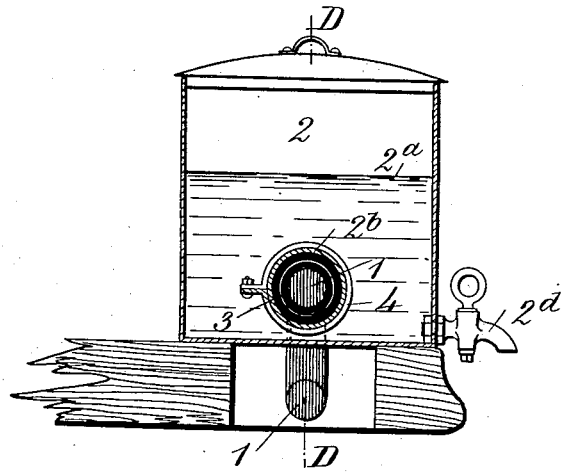

A. F. BERRY.
ELECTRICAL PRODUCTION OF HEAT FOR COOKING AND OTHER PURPOSES.
APPLICATION FILED AUG. 9, 1906.
932,242.
Patented Aug. 24, 1909.
4 SHEETS—SHEET 1.
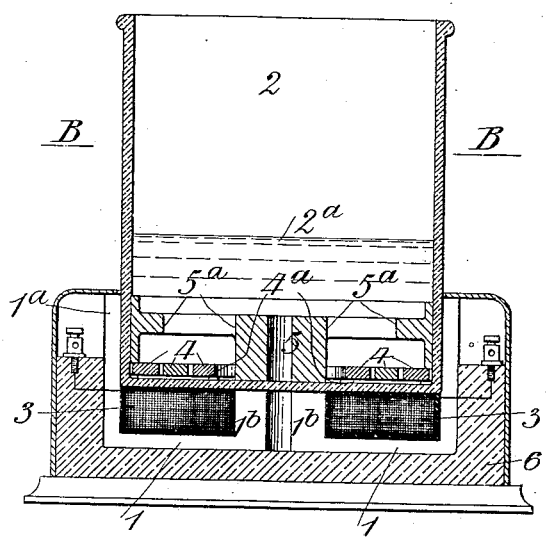
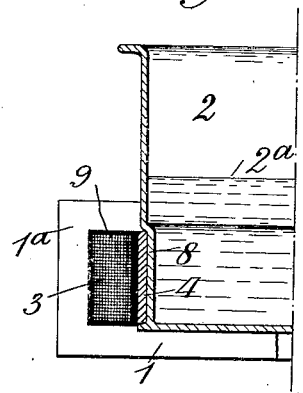
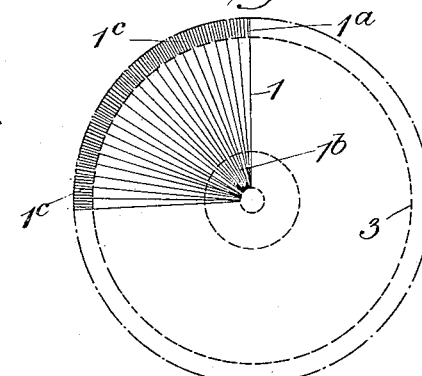
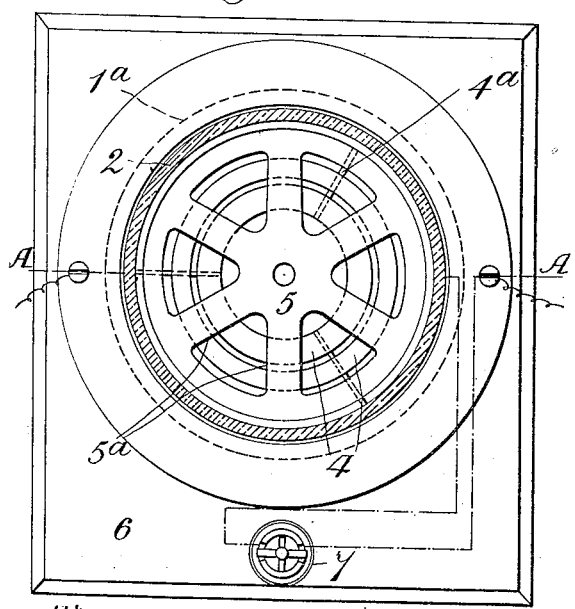
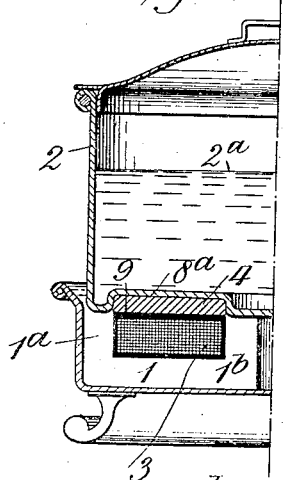
Witnesses
C. R. Wright Jr.
E. R. Pick
Inventor
A. F. Berry
by A. S. Pattison
Attorney A. F. BERRY.
ELECTRICAL PRODUCTION OF HEAT FOR COOKING AND OTHER PURPOSES.
APPLICATION FILED AUG. 9, 1906.
932,242.
Patented Aug. 24, 1909.
4 SHEETS—SHEET 2.
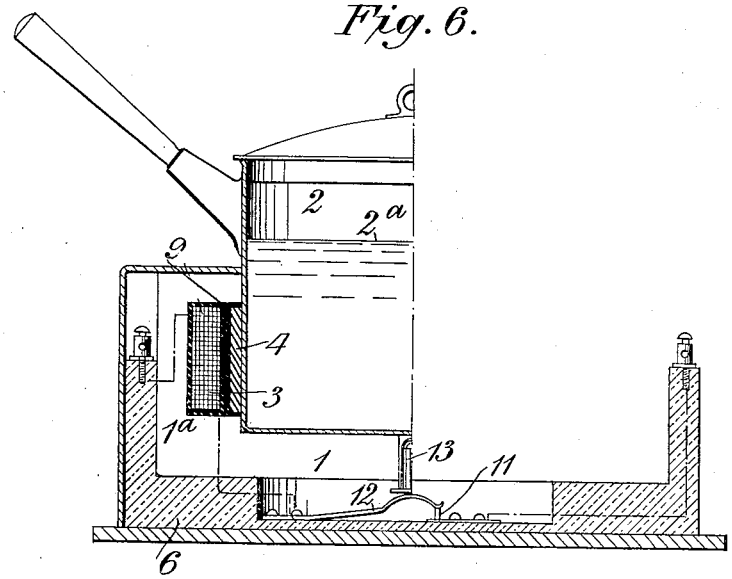
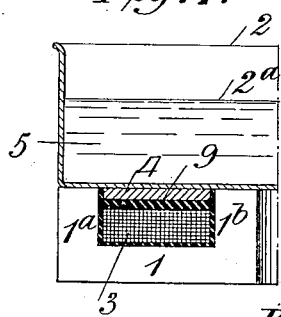
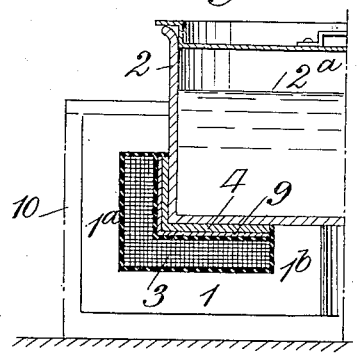
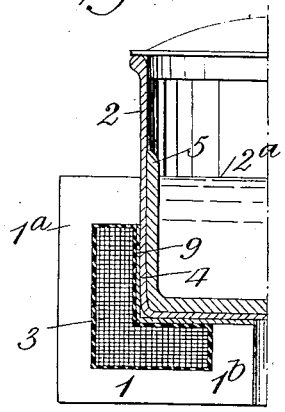
Witnesses
C. P. Wright Jr.
E. R. Peck
Inventor
A. F. Berry
by A. S. Pattison
Attorney A. F. BERRY.
ELECTRICAL PRODUCTION OF HEAT FOR COOKING AND OTHER PURPOSES.
APPLICATION FILED AUG. 9, 1906.
932,242.
Patented Aug. 24, 1909.
4 SHEETS—SHEET 3.
Fig. 10.
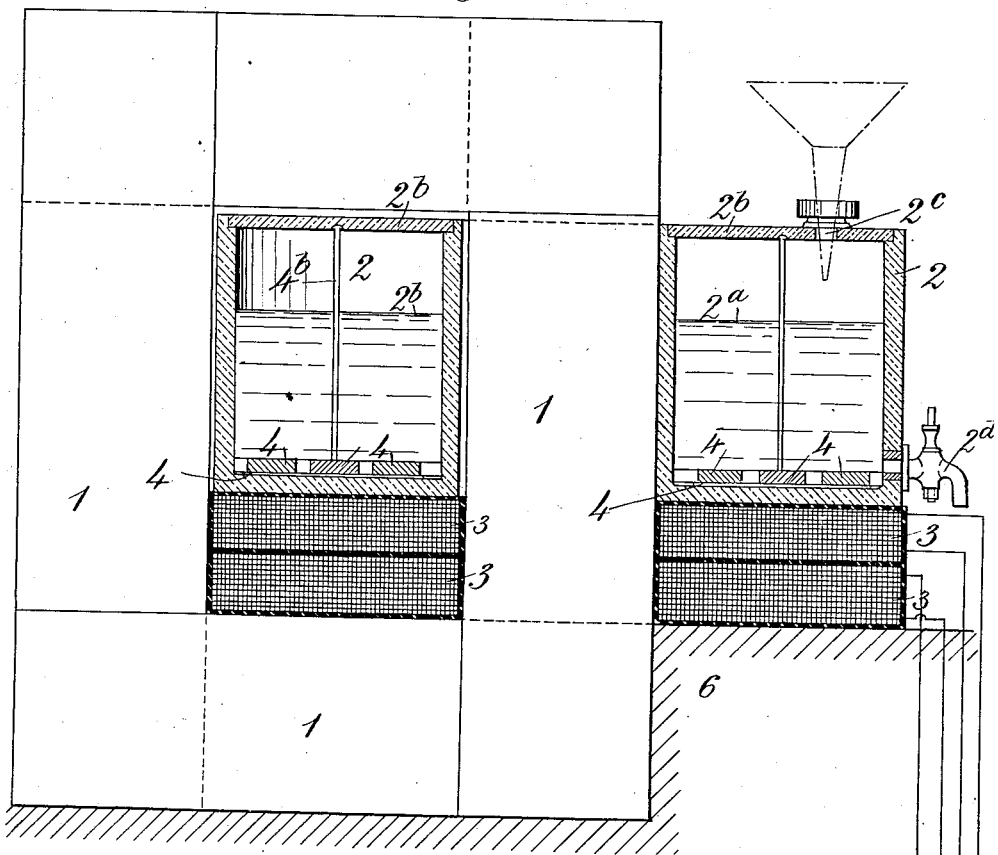
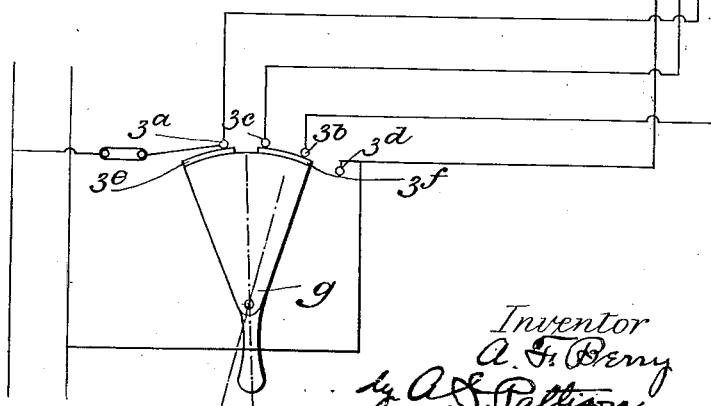

A. F. BERRY.
ELECTRICAL PRODUCTION OF HEAT FOR COOKING AND OTHER PURPOSES.
APPLICATION FILED AUG. 9, 1906.

932,242.

Patented Aug. 24, 1909.
4 SHEETS—SHEET 4.

Witnesses
C. P. Wright Jr.
E. R. Peek

Inventor
A. F. Berry
by A. S. Pattison
Attorney

UNITED STATES PATENT OFFICE.

ARTHUR FRANCIS BERRY, OF EALING, ENGLAND.

ELECTRICAL PRODUCTION OF HEAT FOR COOKING AND OTHER PURPOSES.

932,242.  Specification of Letters Patent.  Patented Aug. 24, 1909.

Application filed August 9, 1906. Serial No. 329,876.

*To all whom it may concern:*

Be it known that I, ARTHUR FRANCIS BERRY, a subject of the King of Great Britain and Ireland, residing at Ealing, in the county of Middlesex, England, have invented Improvements in or Relating to the Electrical Production of Heat for Cooking and other Purposes, of which the following is a specification.

This invention has reference to the production of heat by electrical means and it has for object to enable such heat to be produced in a simple, safe and economical manner for domestic and other purposes, and also to provide electrical heating apparatus of simple construction, suitable for various useful purposes. For this purpose in apparatus according thereto, the required heat is produced by alternating current of great strength and low voltage induced in a solid metallic secondary conductor or conductors by the action of an alternating current of comparatively small strength and high voltage in a primary conductor or conductors. As in such apparatus considerable difficulty would be experienced in effecting good contacts if the circuit of the secondary conductor carrying large currents at low voltage, say currents of the order of one thousand amperes and upward at about one or two volts, were made and broken by a switch device upon putting the apparatus in and out of use, and as there would be a considerable induction drop in such a secondary circuit and irregular results would be obtained, if the switch contacts for closing the said secondary circuit did not make practically perfect connection with each other, the said secondary conductor or each such conductor is, according to this invention permanently closed upon itself. Also, the secondary conductor, or each secondary conductor, is or may advantageously be arranged on, within or in proximity to the primary conductor or conductors so as to be under the direct inductive action thereof. Also, such secondary conductor, or each secondary conductor, owing to the low voltage therein, may be bare or uninsulated but may, where necessary, be specially insulated from the primary conductor or conductors so as to protect the latter against undue heating.

The invention consists in various novel features of construction and in combinations and arrangements of parts all as hereinafter more particularly described.

In apparatus according thereto, liquid or other substance contained in a kettle, saucepan, boiler, oven or other vessel or chamber (hereinafter called a vessel), is heated by means of one or more electrical conductors constructed to form one or more permanently closed circuits arranged within or close to, or so as to come close to, the exterior of the vessel and to form a secondary conductor or conductors in which an alternating current is set up by current in a primary conductor wound upon a magnetic core that is adapted to receive or support, or is combined with the vessel, and to produce in the closed conductor or conductors, secondary currents of low voltage, the arrangement being such that when the apparatus is in action and the vessel is placed within, upon or combined with the magnetic core, the contents of the vessel will be subject to the heat produced by secondary currents inductively set up in the closed conductor or conductors. Such conductor or conductors is or are hereinafter referred to as the electrical heater.

When the electrical heater is placed within or attached to the exterior of the vessel, the magnetic core may be adapted to admit of the insertion, or partial insertion, of the vessel therein so that upon placing the vessel in the core when the apparatus is in action, so as to bring the electrical heater within the magnetic field of the core, heat will at once be produced electrically in such heater, and upon removing the vessel from the core, heat will cease to be produced in the electrical heater, the apparatus being left on open circuit, so as to minimize waste of energy, should it have been left in action. The electrical heater may be fixed in or be removable from the vessel and be in the form of one or more continuous metal rings or frames that may be arranged one within or above the other and be bare, or be covered with suitable material, for example enamel, to admit of the heater being readily washed and kept clean.

The magnetic core may be constructed in various forms to suit the vessel to be heated. Conveniently it may comprise a number of laminated or solid iron plates each comprising vertical and lower horizontal members, the several plates being arranged vertically and radially or otherwise so as to form a star or other shaped group, as seen in plan, having a circular, oval or other shaped recess between the several vertical members for the reception of the vessel the contents of which are to be heated electrically. The lower members of the plates may be provided with upward extensions to form recesses for the reception of the primary winding of the apparatus which then rests within the recesses and upon the lower members. Or the vertical members may be provided at their upper ends with inward extensions to form vertical recesses for the reception of a vertically arranged primary winding. The core may however be constructed as an iron casting in one or more pieces. The vessel may with advantage be provided internally with one or more iron devices of ⊓ or equivalent section arranged to form, in conjunction with the portion of the core outside the vessel, a more or less complete magnetic circuit inclosing the primary winding and electrical heater. Conveniently a single removable iron device may be used for the purpose just mentioned, such device comprising for example, a circular, oval or other shaped plate formed with diverging slots and having a downwardly extending central portion to rest upon the bottom of the vessel. Such a device may be an iron casting.

Figure 12:
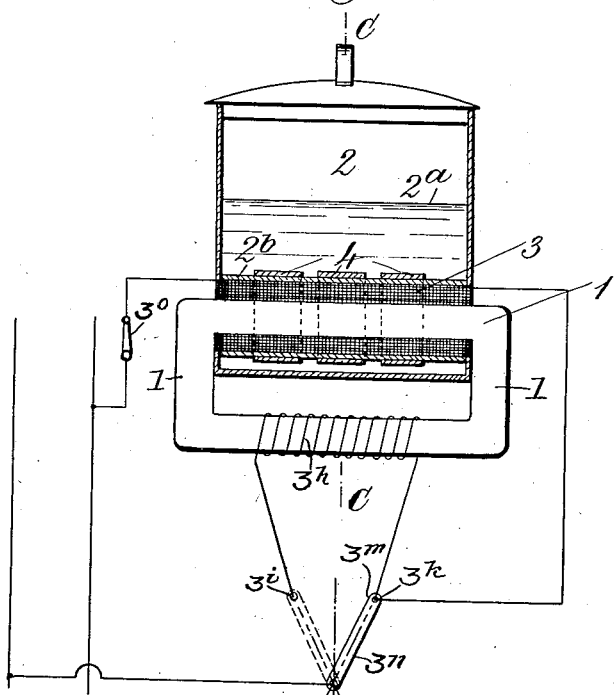

In the accompanying illustrative drawings, Figure 1 shows in vertical section on the line A A of Fig. 2, and Fig. 2 in horizontal section on the line B B of Fig. 1, one construction of electric heating apparatus according to the present invention. Fig. 3 is a plan of the magnetic core shown in Figs. 1 and 2, the other parts being removed. Figs. 4 to 10 inclusive are similar views to Fig. 1 showing parts of modified constructions of electrical heating apparatus. Fig. 11 is a section on the line C C of Fig 12, and Fig. 12 is a section on the line D D of Fig. 11, showing another modified construction.

Referring to Figs. 1, 2 and 3, the magnetic core forming the stationary part of the apparatus, comprises, in this example, a number of plates 1 arranged more or less radially (Fig. 3) with their flat sides vertical and each having an outer vertical member $1^a$ and an inner vertical member $1^b$. The spaces between the outer members $1^a$ may advantageously be filled in with other vertical strips $1^c$, as shown in Fig. 3, so as, in conjunction with the vertical members $1^a$, to form a laminated ring for the reception of the correspondingly shaped vessel 2 which is designed to contain the liquid to be heated or the substance to be cooked. This vessel rests on the inner vertical members $1^b$ and is held in position by the outer laminated ring $1^a$—$1^c$. 3 is the primary winding arranged in the lower circular recess formed by and between the members 1, $1^a$ and $1^b$, 4 are concentrically arranged metal rings that constitute the electrical heater and are held in place within the vessel 2 but are removable therefrom. These rings may be connected together, to form one removable piece, by distance pieces such as radial bars or pins $4^a$. These bars or pins may be fixed, as by soldering or brazing, to the underside of the rings so as to support such rings at a distance above the bottom of the vessel and allow of liquid passing below them. The rings and distance pieces, which may be of copper, may be coated with material such as enamel, tin, silver or nickel to prevent them affecting the liquid to be heated or being affected by such liquid, and to enable them to be easily kept clean. 5 is a circular iron casting of double ⊓ section resting upon the bottom of the vessel 2 so as to extend over the secondary conductors 4 and complete the magnetic circuit of the magnetic core 1, $1^a$, $1^b$, $1^c$, the said casting having therein a number of diverging slots $5^a$ to allow of the material to be heated coming into direct contact with the electrical heater 4. 6 is an insulating base provided with a switch 7 for switching on and cutting off the supply of alternating current for the primary winding 3.

As will be seen, the arrangement is such that when current is switched on to the primary winding 3 by the switch 7, then, upon placing the vessel 2 with electrical heater 4 and iron casting 5 in the magnetic core 1, $1^a$, $1^b$, $1^c$, secondary currents will be induced in the electrical heater 4 that will heat the same, and the liquid $2^a$ in contact therewith, and upon removing the vessel, current and consequently heat, will cease to be produced in the electrical heater 4 and very little energy will then be wasted in the combined primary winding and core.

Instead of placing the heater 4 inside the vessel 2, it may, as shown in Fig. 4, be secured to the exterior thereof, near its lower end, so as to extend around the lower edge of the vessel and preferably within an annular recessed part 8 thereof. Or the heater 4 may be secured in an annular recess $8^a$ in the bottom of the vessel 2, as shown in Fig. 5. Or, it may be held within the magnetic core 1, $1^a$, $1^b$, $1^c$ and be so shaped as to be adjacent to the side wall of the vessel, as shown in Fig. 6; or to the bottom of the vessel, as shown in Fig. 7; or to both the side wall and bottom of the vessel, as shown in Fig. 8.

When the heater is outside the vessel, the apparatus may be provided with material 9, for example asbestos, to protect the core 1, $1^a$, $1^b$, $1^c$ and primary winding 3 from the heat set up in the electrical heater 4. The core may, as shown in Fig. 8, also be surrounded with material 10 that is a bad conductor of heat, to prevent loss of heat by radiation. When the electrical heater 4 is to be carried by the vessel, it may, as shown in Fig. 9 be arranged to form part thereof, say part of its side wall, or bottom, or both, instead of being made separate from and placed therein or fixed thereto. The magnetic circuit of the core may in this case also be closed by iron, as by a circular iron casting like 5 in Figs. 1 and 2. Or, if the vessel be of iron, its wall will serve to complete the magnetic circuit of the iron core and may, at the same time, serve as the secondary conductor in which heat will be generated by currents induced therein.

Fig. 10 shows another arrangement in which the electrical heater is placed inside the vessel containing the liquid to be heated. In this example, the vessel 2 is of annular shape, and the laminated iron core 1, which may, as shown, be of rectangular shape and be formed of iron stampings, extends through the hollow center of the vessel 2 so as to surround the vessel and the electrical heater 4 therein, and is energized by the primary winding 3. The electrical heater, which is like that hereinbefore described and shown in Figs. 1 and 2, may be held down by rods $4^b$ placed between it and the cover $2^b$ of the vessel. $2^c$ is a hole in the cover for charging the vessel with cold liquid, and $2^d$ is a draw off cock for hot liquid. 6 is a base for the apparatus.

In the modified arrangement shown in Figs. 11 and 12, the vessel 2 is of rectangular shape and has two of its opposite sides connected by a non-metallic tubular portion $2^b$ through which the magnetic core 1 with primary winding 3 extends. The secondary winding 4, shown as several complete rings, surrounds the tubular portion $2^b$ of the vessel, the primary winding 3 and the portion of the magnetic core 1 extending through the same, so as to be in direct contact with the liquid $2^a$ to be heated.

When the electrical heater 4 is arranged within the vessel 2, as in Figs. 1, 2 and 3, and in Figs. 10, 11 and 12, the said vessel may be constructed of various materials but preferably of non-metallic or non-conducting material, for example stoneware, glass, and the like. When the electrical heater is external to the vessel, as in Figs. 4 to 8 inclusive, the vessel, or part thereof, should be made of good conducting material such as metal.

The apparatus may, as shown in Fig. 6, be provided with a switch having a fixed contact 11 and a movable spring contact 12 so constructed and arranged, as shown, that the latter contact will be moved, as through a non-conducting plunger 13, into the closed position to close the circuit of the primary winding 3 when the vessel 2 is placed in position in or on the core, and will automatically move into the open position, to open the circuit of the primary winding, when the vessel is removed.

Heating apparatus of the kind hereinbefore described may be provided with means whereby the degree of heat can be varied from time to time to suit requirement, so that, for example, a high degree of heat can be produced for rapidly raising water or other substance to the boiling point, and a less degree of heat for maintaining it at or near the boiling point or at a lower temperature. Various means may be provided for this purpose.

In Fig. 10, the winding 3 is made in two sections arranged one above the other, the upper section having its ends connected to two fixed contacts $3^a$ and $3^b$ and the lower section having its ends connected to two fixed contacts $3^c$ and $3^d$ of a switch device having two insulated movable arc shaped contacts $3^e$ and $3^f$ that are carried by a switch lever $3^g$ and arranged to work over the said fixed contacts. As will be seen, the arrangement is such that when the switch lever $3^g$ is in the position shown in full lines at $a$, the two sections of the winding are connected in series for minimum heating, and when it is moved into position $b$, both sections will be connected in parallel for maximum heating, the circuit of the windings being opened in passing from one position to the other. The sections of the winding will be connected in the reverse order when the switch lever is moved back into the original position.

In the construction of apparatus shown by Figs. 11 and 12, a supplementary winding $3^h$ adapted to act as a choking coil, is wound on the lower limb of the magnetic core 1 as shown in Fig. 12 and connected, with the main winding 3, to the fixed contacts $3^i$, $3^k$ of a switch device having a movable contact $3^m$ carried by a switch lever $3^n$. One end of winding 3 is connected through a switch $3^o$ to one of the electric supply leads, and the lever $3^n$ to the other lead. The arrangement is such that when the switch lever is in the position $a^1$, the main winding 3 is in circuit and the supplementary winding $3^h$ is out of circuit so as to enable the maximum degree of heating to be obtained, and when the lever is moved into the position shown at $b^1$, both windings 3 and $3^h$ are connected in series with each other so as to allow of a lower degree of heating being obtained in an economical manner. When the switch lever is moved into position $c^1$, the circuit of both windings is open and the apparatus put out of use.

In some cases, part of the magnetic core of the apparatus may, as hereinbefore mentioned with reference to Fig. 9, be adapted to also serve as the secondary conductor or part in which the heat is to be produced electrically by the inductive action of the primary winding, a separate secondary conductor or conductors being used, or not, as may be desired.

In each of the arrangements hereinbefore described, it will be seen that the part thereof in which heat is electrically produced is not in metallic connection with the source of electric supply, and that a current of low voltage only is produced therein.

When heating apparatus such as hereinbefore described is to be used in connection with a direct current supply instead of with an alternating current supply, means, such as an interrupter, is provided for causing an intermittent, pulsating or undulatory current to pass through the primary winding 3 of the apparatus. Such a current is intended to be included in the term alternating current used in the foregoing description.

As will be obvious, electrical heating apparatus and heating vessels or devices embodying the invention hereinbefore set forth, can be constructed in various forms other than those shown, to suit different requirements.

What I claim is:—

1. Electrical heating apparatus comprising a magnetic core having a closed magnetic circuit, and primary and secondary conductors arranged in close proximity to each other throughout their length and to surround a part of said core, said secondary conductor being permanently closed on itself and arranged to be exposed throughout its length to the body to be heated.

2. Electrical heating apparatus comprising a magnetic core having a closed magnetic circuit, a primary winding surrounding a part of said core, a low voltage secondary conductor constituting a single turn of solid metal permanently closed on itself, arranged in close proximity to said primary winding, surrounding the same part of the magnetic core as said primary winding and arranged to be exposed throughout its length to the body to be heated.

3. Electrical heating apparatus comprising a magnetic core, a primary winding thereon and a secondary conductor consisting of a single turn of metal permanently closed on itself and of substantially uniform cross section throughout its length, said secondary conductor being arranged in inductive relation to the primary winding and so as to be exposed throughout its length to the material or body to be heated.

4. Electrical heating apparatus comprising a primary winding, a vessel to contain the material or body to be heated, and a solid annular secondary conductor of non-magnetic material permanently closed on itself and arranged at the lower part of said vessel and adjacent to said primary winding so as to be under the inductive action thereof.

5. Electrical heating apparatus comprising a primary winding, a vessel to contain the material or body to be heated; and a solid secondary conductor of non-magnetic material permanently closed on itself, arranged at the lower part of said vessel and surrounding said primary winding.

6. Electrical heating apparatus comprising a magnetic core, a primary winding thereon, a vessel to contain the material or body to be heated, and an annular secondary conductor of non-magnetic metal arranged at the lower part of said vessel and so as to heat the contents of said vessel and subject to the action of said core.

7. Electrical heating apparatus comprising a magnetic core, a primary winding thereon, a vessel to contain the material or body to be heated, and an annular secondary conductor consisting of a single turn of non-magnetic metal permanently closed on itself, said secondary conductor being arranged at the lower part of said vessel and in inductive relation to said primary winding and so as to heat the contents of said vessel.

8. Electrical heating apparatus comprising a magnetic core, a primary winding thereon, a vessel to contain the material or body to be heated, and a plurality of annular secondary conductors having a common axis and each consisting of a single turn of non-magnetic metal permanently closed on itself, said secondary conductors being arranged in inductive relation to said primary winding and so as to heat the contents of said vessel.

9. Electrical heating apparatus comprising a magnetic core, a primary winding thereon, a vessel to contain the material to be heated, and an annular body at the bottom only of said vessel and in which heat is generated electrically when the apparatus is in use and whereby the contents of said vessel will be heated.

10. Electrical heating apparatus comprising a magnetic core, a primary winding thereon, a vessel to contain the material to be heated, and a non-magnetic annular body arranged at the bottom only of said vessel and in which heat will be generated electrically when the apparatus is in use, said body being arranged to come in contact with the contents of said vessel.

11. Electrical heating apparatus comprising a magnetic core, a primary winding thereon, a vessel to contain the material to be heated, and a low voltage solid secondary conductor of non-magnetic metal permanently closed on itself so as to form a closed circuit arranged in said vessel and in inductive relation to said primary winding.

12. Electrical heating apparatus comprising a magnetic core, a primary winding thereon, a vessel to contain the material to be heated, and a low voltage solid secondary conductor of non-magnetic metal permanently closed on itself, arranged in said vessel, and in inductive relation to said primary winding and traversed by part of the magnetic core.

13. Electrical heating apparatus comprising a magnetic core, a primary winding thereon, a vessel to contain the material to be heated, and a plurality of secondary conductors each consisting of a ring permanently closed on itself and through which the magnetic circuit extends.

14. Electrical heating apparatus comprising a magnetic core, a primary winding thereon, a vessel to contain the material to be heated, said vessel having a tubular part through which said core extends, and a secondary conductor located in said vessel and surrounding the tubular part thereof and the portion of the core extending therethrough.

15. Electrical heating apparatus comprising a magnetic core, a primary winding thereon, a vessel to contain the material to be heated, said vessel having a tubular part through which said core extends, and a plurality of secondary conductors each consisting of a ring located in said vessel and surrounding said tubular part and the portion of the core extending therethrough.

16. Electrical heating apparatus comprising a magnetic core, a primary winding thereon, a vessel to contain the material to be heated, and one or more solid low voltage secondary conductors arranged within said vessel and in direct contact with the contents thereof.

17. Electrical heating apparatus comprising a magnetic core, a primary winding thereon, a vessel to contain the material to be heated, and one or more solid low voltage secondary conductors arranged within said vessel and in direct contact with the contents thereof and consisting or each consisting of a single turn.

18. Electrical heating apparatus comprising a magnetic core, a primary winding thereon, a vessel to contain the material to be heated, and a solid low voltage secondary conductor consisting of a single turn arranged in said vessel and in inductive relation to said primary winding.

19. Electrical heating apparatus comprising a magnetic core, a primary winding thereon, a vessel to contain the material to be heated, said vessel being traversed by part of the magnetic core, and a secondary conductor traversed by said core and arranged to heat the contents of said vessel.

20. Electrical heating apparatus comprising a magnetic core, a primary winding thereon, means for varying the action of said winding, a vessel to contain the material to be heated, said vessel being traversed by part of the magnetic core, and a secondary conductor traversed by said core and arranged to heat the contents of said vessel.

21. Electrical heating apparatus comprising a magnetic core, a primary winding thereon, a vessel to contain the material to be heated, said vessel being formed of non-metallic material, and one or more low voltage secondary conductors within said vessel and in inductive relation to said primary winding.

22. Electrical heating apparatus comprising a magnetic core, a primary winding thereon, a vessel to contain the material to be heated, a low voltage secondary conductor permanently closed on itself and arranged to heat the contents of said vessel, and heat insulating material between said primary winding and secondary conductor.

23. Electrical heating apparatus comprising a magnetic core, a primary winding thereon, a vessel of non-conducting material to contain the material to be heated, said vessel being traversed by a horizontal tubular part of non-conducting material containing said primary winding and through which said core extends, and one or more metallic rings located in said vessel and surrounding said tubular part.

24. Electrical heating apparatus comprising a magnetic core, a primary winding thereon, a glass vessel to contain material to be heated, said vessel having a tubular part of glass integral therewith, containing said primary winding and traversed by said core, and one or more metal rings located in said vessel and surrounding the tubular part thereof.

25. Electrical heating apparatus comprising a magnetic core, a primary winding thereon, a glass vessel to contain material to be heated, said vessel having a tubular part of glass integral therewith, containing said primary winding and traversed by said core, one or more permanently closed metal rings located in said vessel and surrounding the tubular part thereof, and means for varying the inductive effect of said winding on said rings.

26. Electrical heating apparatus comprising a magnetic core having a closed magnetic circuit, a primary winding thereon, a vessel to contain material to be heated, and a hollow secondary conductor of non-magnetic metal arranged at the bottom of said vessel and surrounding said primary winding, traversed by said core and arranged so as to heat the contents of said vessel, substantially as hereinbefore described.

Signed at London England this twenty-eighth day of July 1906.

ARTHUR FRANCIS BERRY.

Witnesses:
CHARLES COPS,
H. D. JAMESON.